Patented May 2, 1933

1,907,003

UNITED STATES PATENT OFFICE

EDWARD W. RICE, OF SANTA CRUZ, CALIFORNIA, ASSIGNOR TO SANTA CRUZ PORTLAND CEMENT COMPANY, OF SAN FRANCISCO, CALIFORNIA, A CORPORATION OF CALIFORNIA

HYDRAULIC CEMENT

No Drawing.   Application filed January 16, 1932.   Serial No. 587,157.

This invention relates to cement making and has for its objects the production of an hydraulic cement of superior properties as well as one which can be economically produced.

Briefly described, the cement consists of a combination of lime, silica and Portland cement clinker in certain proportions combined in a manner to yield a cement having unusual characteristics of considerable value in the art.

The ingredients used in combination with the Portland cement clinker consist of a highly siliceous material such as clay or shale and an active form of lime such as burned lime CaO or hydrated lime Ca(OH)$_2$.

I have discovered that if any form of silica is reduced to extreme fineness in mixture with such lime it will slowly combine with the lime, and that the rate of combination is dependent on the area of surface of the silica particles exposed to the lime, assuming of course that the lime is also in a finely reduced condition and in intimate contact with the silica particles.

As it is evident that foreign matter will to a certain extent prevent the necessary contact of the reacting particles, it follows that with some siliceous materials containing asphaltic, oily or other organic compounds, calcination with excess of air at a temperature to remove such matter would be desirable. The reaction in presence of such foreign matter would still take place however without calcination, but would be slower, and in some cases I have found it an advantage to use an uncalcined or raw siliceous material, when comparatively free from contaminating substances, where extreme early activity of the cement is not necessary. The presence of alumina with the silica makes it possible to obtain a much finer division of the silica in grinding.

In regard to the lime content (apart from that contained in the clinker) whether this is CaO or Ca(OH)$_2$ is of no consequence in ordinary use of the cement, though the slight increase of temperature obtained during the setting of the cement if CaO is used acts as an accelerant to the setting reaction.

The preferred proportions and method of making the cement are as follows:

To 70% by weight of well burned Portland cement clinker is added about 24% of shale and about 6% of quicklime and the usual small amount of gypsum for the clinker content to control the set. These proportions will vary somewhat with the nature of the siliceous material used and are worked out for a Monterey shale running about 75% silica. Various clays may be used as well as shale.

The clinker, shale, lime and gypsum are all ground together in a cement mill to an extremely fine condition, preferably so that about 95% will pass a 200 mesh, though it may be reduced still further with advantage.

The resulting powder is a cement which may be used in the manner of regular Portland cement by gaging with water, but in actual tests against average Portland cement, both in neat form as well as in concrete, it shows a marked increase in early strength as well as at the end of the 28 day period covered by the tests.

The reason for the rapid development of great strength in the combination is thought due to the silica-lime reaction being promoted by the "seed crystals" of calcium silicate quickly supplied by the Portland cement reaction at once starting or promoting the calcium silicate reaction from the silica-lime content. Also to the heat generated by the setting of the Portland cement accelerating the silica-lime reaction.

By the use of this silica-lime-Portland cement combination I have found it possible to produce a cement with high early strength which continues to gain over long periods of time, in fact over a longer period than do ordinary or high early Portland cements.

I have also found that the degree of high early strength and long time increase of the combined cement is dependent on the fineness of grinding and thorough mixing of the ingredients, and that one of the important features contributing to this is the combined grinding of the siliceous material and lime with the clinker, as it results in an intimate association of the constituent which greatly promotes the dual reactions, for with ordinary cement fineness of the compound cement (87-92 through a 200 mesh) the advantages over ordinary Portland cement were not very noticeable.

As an index to the practical grinding of this compound cement it might be mentioned that with a Portland cement grinding equipment running about 80-100 barrels per hour of a fineness of 92% through a 200 sieve, this slowed down to about a 50 barrel output on the compound cement yielded a satisfactory fineness.

Experiments with various proportions of clinker to silica-lime content have shown that the preferred proportions given (70-30) to be about right for best results and economy of grinding, though a 50-50 ratio gave results superior to average Portland cement even when raw shale was used.

The advantages of this compound cement over Portland cement, as shown by careful repeated tests, are as follows:

1. Lower cost of manufacture
2. Lower specific gravity
3. Greater plasticity and workability
4. Greater sand carrying capacity
5. Good early strength
6. Strength increases over a longer period of time
7. Greater ultimate strength
8. More flexible in neat, mortar or concrete
9. More resistant to sea water
10. Greater resistance to water permeability
11. Generates less heat than Portland cement I am of course aware of many attempts to modify Portland cements with lime and other ingredients and the mixing of cement with lime mortars, trass cement, etc., but to date no generally useful commercial product has resulted from the various suggestions found in the art, and I therefore feel that since I have, through the study of the problem and the carrying out of many tests and changes in ingredients, proportions and grinding procedure, been the first to determine the proper ingredients, their proportions for best results as well as the influence of the grinding so as to successfully produce such a cement in merchantable form, and which bids fair to take equal place if not the place of the Portland cement as we now know it, that I am entitled to protection on the improvements which I have made.

I therefore claim:

1. The process of making an hydraulic cement which comprises grinding shale, lime and Portland cement clinker together to a fineness where more than 94% will pass a 200 mesh sieve.

2. The process of making an hydraulic cement which comprises grinding together about 24% shale, 6% lime, and 70% Portland cement clinker to a fineness where more than 94% will pass a 200 mesh sieve.

3. The process of making an hydraulic cement which comprises grinding together about 24% calcined shale, 6% slaked lime, and 70% Portland cement clinker to a fineness where more than 94% will pass a 200 mesh sieve.

4. An hydraulic cement composed of an intimate mixture of shale, lime and Portland cement clinker all reduced to a fineness where more than 94% will pass a 200 mesh sieve.

EDWARD W. RICE.